US012023955B2

(12) United States Patent
Cyrot

(10) Patent No.: US 12,023,955 B2
(45) Date of Patent: Jul. 2, 2024

(54) METHOD FOR TEXTURIZING CAPSULES

(71) Applicant: AMCOR FLEXIBLES NORTH AMERICA, INC., Neenah, WI (US)

(72) Inventor: Lucas Franck Cyrot, Bourgogne (FR)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 0 days.

(21) Appl. No.: 17/792,375

(22) PCT Filed: Feb. 3, 2020

(86) PCT No.: PCT/US2020/016328
§ 371 (c)(1),
(2) Date: Jul. 12, 2022

(87) PCT Pub. No.: WO2021/158202
PCT Pub. Date: Aug. 12, 2021

(65) Prior Publication Data

US 2023/0042769 A1 Feb. 9, 2023

(51) Int. Cl.
*B44B 5/00* (2006.01)
*B44C 1/24* (2006.01)

(52) U.S. Cl.
CPC .......... *B44B 5/0014* (2013.01); *B44B 5/0047* (2013.01); *B44C 1/24* (2013.01)

(58) Field of Classification Search
CPC ........ B44C 1/24; B44B 5/0047; B44B 5/0014
See application file for complete search history.

(56) References Cited

U.S. PATENT DOCUMENTS

| | | | |
|---|---|---|---|
| 706,013 | A | 8/1902 | Boyce |
| 2,957,412 | A | 10/1960 | Rainey |
| 3,311,077 | A | 3/1967 | Charles et al. |
| 3,416,474 | A | 12/1968 | Charles |

(Continued)

FOREIGN PATENT DOCUMENTS

| | | | |
|---|---|---|---|
| CN | 104353751 | A | 2/2015 |
| DE | 3528903 | A1 | 2/1987 |

(Continued)

OTHER PUBLICATIONS

PCT International Search Report, International Application No. PCT/US2020/016328, issued May 11, 2020, 3 pages.

*Primary Examiner* — David H Banh

(57) ABSTRACT

Described herein are methods for texturizing metal, closed-end, cylindrical workpieces or capsules. A texturizing apparatus that includes a texturizing sector and a texturizing spindle tip is disclosed. The metal, closed-end, cylindrical workpieces or capsules are placed onto the texturizing spindle tip that includes a texture. A pressure is applied to the texturizing sector and the metal, closed-end, cylindrical workpiece or capsule, and the texturizing spindle tip is rotated against the texturizing sector to impart an image of the texturizing spindle tip texture to the metal, closed-end, cylindrical workpiece or capsule. The texturizing sector may include a smooth surface and a resilient material, and the texturizing spindle tip may include a textured surface and a non-resilient material. The texture of the metal, closed-end, cylindrical workpiece or capsule includes the imparted image of the texturizing spindle tip texture.

6 Claims, 10 Drawing Sheets

(56) References Cited

U.S. PATENT DOCUMENTS

| | | | | |
|---|---|---|---|---|
| 3,815,493 | A | 6/1974 | Broderick | |
| 4,037,283 | A | 7/1977 | Moisiuk | |
| 4,109,385 | A | 8/1978 | Zahn et al. | |
| 5,155,604 | A * | 10/1992 | Miekka | B44B 5/009 359/2 |
| 5,173,363 | A * | 12/1992 | Fitch | B41M 5/504 428/305.5 |
| 6,338,263 | B1 * | 1/2002 | Obata | B21D 51/26 72/94 |
| 10,065,233 | B2 | 9/2018 | Ichimura et al. | |
| 2002/0090578 | A1 * | 7/2002 | Schaefera | B21H 8/02 430/1 |
| 2005/0022682 | A1 * | 2/2005 | Caron | B44B 5/026 101/32 |
| 2007/0289935 | A1 | 12/2007 | Granger et al. | |
| 2010/0251911 | A1 | 10/2010 | Nakata | |
| 2010/0264107 | A1 * | 10/2010 | Lonsway | C03B 9/325 65/78 |
| 2017/0101227 | A1 * | 4/2017 | Aagaard | B29C 66/7422 |
| 2020/0215597 | A1 * | 7/2020 | Manita | B65D 7/04 |

FOREIGN PATENT DOCUMENTS

| | | |
|---|---|---|
| ES | 2363680 | 5/2012 |
| GB | 1033604 | 6/1966 |
| GB | 1394363 | 5/1975 |
| JP | 2008126264 A | 6/2008 |

* cited by examiner

METHOD FOR TEXTURIZING CAPSULES

TECHNICAL FIELD

The present disclosure relates to a method for texturizing capsules and more specifically for receptacles and bottles containing alcoholic drinks, such as wine, sparkling wine or spirits.

BACKGROUND

Metal, closed-end, cylindrical workpieces are available in many sizes. A specific metal, closed-end, cylindrical workpiece sized to be used with a bottle, such as a wine bottle, is referred to as a capsule. Capsules are known to provide a covering to a seal for example, a cork or a plug in the opening of a bottle neck, such as an overcap. In other instances, capsules provide a seal or closure to a bottle, such as a screw stopper capsule. Screw stopper capsules are formed from a flat sheet of metal (e.g., aluminum) that is drawn to form a closed-end cylinder. Overcaps can be drawn from flat metal sheets (e.g., aluminum) or can alternatively be formed by rolling a sheet or blank into a closed-end, frustoconical shape.

Knurling processes are generally known by one of skill in the art to prepare the capsules, for example, screw stopper capsules, for use with a bottle. A cylindrical tool and another cylindrical tool rotate against each other under applied pressure such that technical features are formed in a circumference of the capsule. Technical features of a screw stopper capsule include a weakening line for opening (e.g., a bridge line), crimping beads (e.g., bead grooves) to avoid tearing of the capsule during application of the capsule onto a bottle, and knurls for improved grip while opening or closing the cap, for example.

Capsules often include printing, engraving or etching for decorative purposes or for brand or bottle content identification. Printing, engraving and etching involve subsequent manufacturing steps and add equipment, complexity and cost beyond the formation of the technical features. Additionally, improved grip is especially desirable for bottles containing spirits that are vintage, of unusual provenance or otherwise costly where accidental spillage is deemed unacceptable.

SUMMARY

The inventors have created a capsule that conveys information, provides improved grip, or provides decoration without interfering with the formation of capsule technical features and without additional manufacturing complexity or cost. Capsules such as these are heretofore unknown.

The present application describes a method to texturize metal, closed-end, cylindrical workpieces or capsules.

In one embodiment, the method for texturizing a metal, closed-end, cylindrical workpiece includes several steps. The first step includes providing a texturizing apparatus that includes a texturizing sector and a texturizing spindle tip. The next step includes providing a metal, closed-end, cylindrical workpiece. The subsequent step includes placing the metal, closed-end, cylindrical workpiece onto the texturizing spindle tip. This step is followed by applying a pressure between the texturizing sector and the metal, closed-end, cylindrical workpiece. The next step includes rotating the texturizing spindle tip to impart a texture to the metal, closed-end, cylindrical workpiece.

In this embodiment, at least one of the texturizing sector or the texturizing spindle tip includes material. The texturizing sector includes a texturizing spindle tip facing surface that includes at least a portion that is smooth. The texturizing spindle tip includes a texturizing sector facing surface that includes a texture on at least a portion of a circumference of the texturizing spindle tip. The texturizing sector is positioned external to the metal, closed-end, cylindrical workpiece and the texturizing spindle tip is positioned internal to the metal, closed-end, cylindrical workpiece. At least a portion of a circumference of the metal, closed-end, cylindrical workpiece includes an imparted image of the texturizing spindle tip texture.

In another embodiment, the method for texturizing a metal capsule includes several steps. The first step includes providing a texturizing apparatus that includes a texturizing sector that includes resilient material and a texturizing spindle tip. The next step includes providing a metal capsule comprising aluminum. The following step includes placing the metal capsule onto the texturizing spindle tip. The subsequent step includes applying a pressure between the texturizing sector including resilient material and the metal capsule. This step is followed by rotating the texturizing spindle tip to impart a texture to the metal capsule.

In this embodiment, the texturizing sector including resilient material includes a texturizing spindle tip facing surface including at least a portion that is smooth. The texturizing spindle tip includes a texturizing sector facing surface including. The texturizing sector including resilient material is positioned external to the metal capsule and the texturizing spindle tip is positioned internal to the metal capsule. At least a portion of a circumference of the metal capsule includes an imparted image of the texturizing spindle tip texture.

Other features that may be used individually or in combination with respect to any embodiment are as follows.

The method may include a metal, closed-end, cylindrical workpiece that includes a capsule and the capsule further includes a bridge line, a bead groove, a plurality of knurls, or combinations thereof.

The method may include that the texturizing sector includes resilient material including a Shore A hardness according to ASTM D224 in the range from 85 through 98.

The method may include that the metal, closed-end, cylindrical workpiece includes aluminum.

The method may include that the texturizing spindle tip includes non-resilient material comprising a Rockwell HRC value in the range from 55 through 66.

The method may include that the metal, closed-end, cylindrical workpiece includes a cap and a skirt and where the texture of the texturizing spindle tip is imparted to the skirt.

The method may include that the metal, closed-end, cylindrical workpiece includes a cap and a skirt and where the texture of the texturizing spindle tip is imparted to the cap.

Further, a metal, closed-end, cylindrical workpiece or capsule may include the texture produced by the method of any one of the embodiments and may include any one or more of the other features.

Additionally, a package may include the metal, closed-end, cylindrical workpiece or capsule that is produced by any one of the embodiments and that may include any one or more of the other features. The package further includes a bottle and contains a product.

BRIEF DESCRIPTION OF THE DRAWINGS

Other objects and advantages of the present disclosure will become more apparent to those skilled in the art in view of the following description and the accompanying figures.

FIG. 1A illustrates a perspective view of a capsule formed by rolling a blank into a closed-end, frustoconical shape.

FIG. 1B illustrates a perspective view of a capsule formed by drawing a flat sheet blank.

FIG. 1C illustrates a perspective, cut-away view of a capsule, such as that shown in FIG. 1B, that includes technical features.

The figures show some but not all embodiments. The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

A method for texturizing metal, closed-end, cylindrical workpieces is described herein. A specific form of a metal, closed-end, cylindrical workpiece is a capsule Capsules may be used to cap over a seal or to provide a seal, for example, to receptacles or bottles that may contain wine or spirits. Exemplary metal, closed-end, cylindrical workpiece or capsule materials may include aluminum, tin or a metalloplastic, multi-layer material with a deformation under stress that is similar to the deformation of aluminum or tin, although are not limited to these materials. The deformation under stress properties allow the capsule to be formed after placement on the receptacle.

Figure 1A:
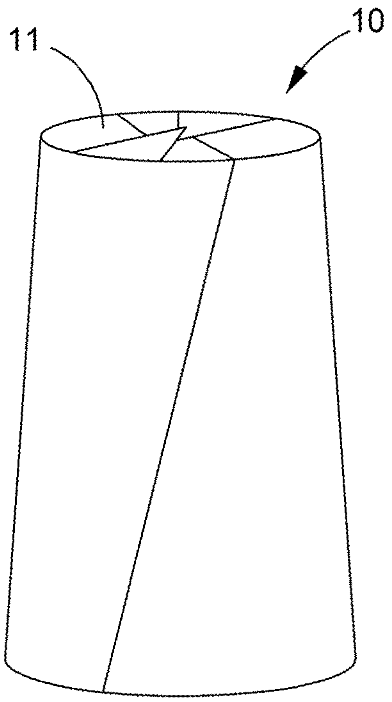
FIG. 1A-1C illustrate several closed-end, cylindrical workpieces in the form of a capsule.

Capsules may be included with a receptacle or a bottle to either provide an overcap to a sealed receptable or to seal the receptable. FIG. 1A shows an overcap capsule 10 that may be formed from a sheet of material that is rolled into a frustoconical shape with the excess material being pressed together to form a closed-end 11 of the overcap capsule 10. The overcap capsule 10 may be placed over the opening of a sealed receptacle (e.g., placed over an opening and neck of a wine bottle that was previously sealed with a cork or a plug).

Figure 1B:
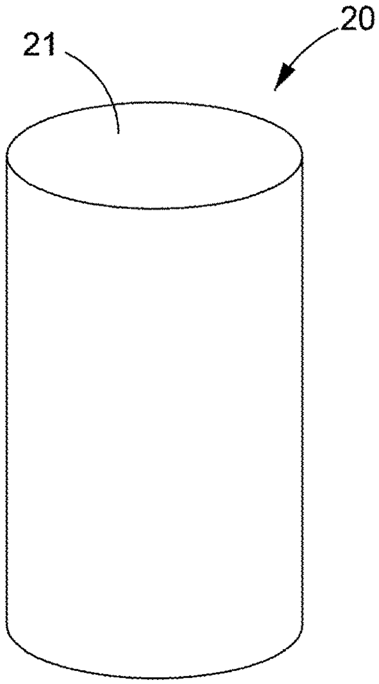

FIG. 1B shows another capsule form that is a precursor to a screw stopper capsule 20. The precursor to a screw stopper capsule 20 is formed from a flat sheet of metal that is drawn, forming a closed-end 21 and may also be used to overcap a sealed receptacle.

Figure 1C:
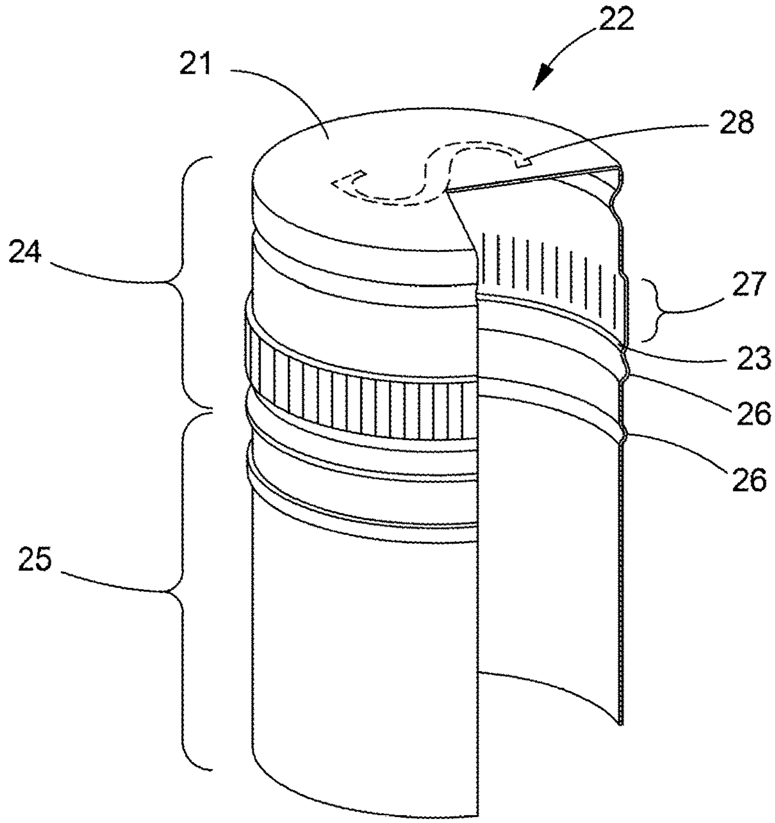

FIG. 1C shows a screw stopper capsule 22 that is formed from the precursor to a screw stopper capsule 20. Screw stopper capsule 22 includes technical features that enable opening and closing after the screw stopper capsule 22 is placed onto and attached to (e.g., capped) a receptacle. The technical, or functional, features include a bridge line 23 that demarcates a cap 24 and a skirt 25. The bridge line 23 includes a score or perforation that when broken, allows the cap 24 to be separated from the skirt 25. Bead grooves 26 are positioned around a circumference of the screw stopper capsule 22 to allow for proper capping to a receptacle. A plurality of knurls 27 are positioned around the circumference of the screw stopper capsule 22 that enables firmer manual gripping of the cap 24 after the screw stopper capsule 22 has been capped onto a receptacle (e.g., placed over the opening of a wine bottle and sealing the opening). The screw stopper capsule 22 may further include non-technical features such as indicia 28 in the form of printing or labels for decorative or branding purposes, usage information communication, etc.

Figure 2A:
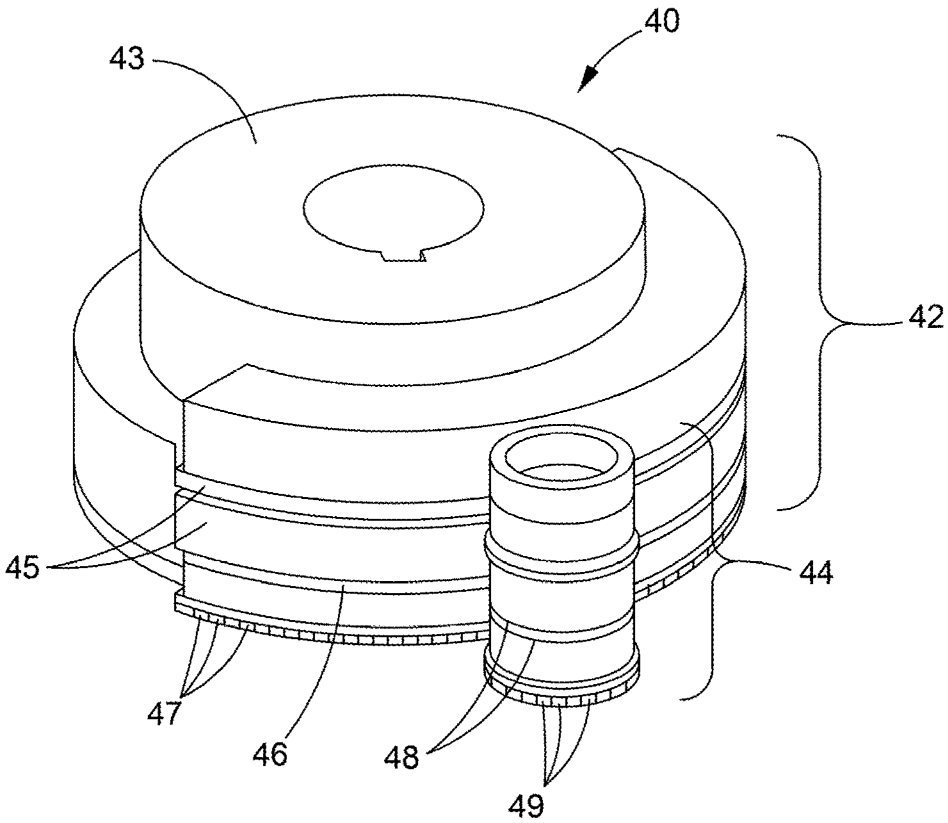
FIG. 2A illustrates a perspective view of a knurling apparatus including a sector and a spindle.

The technical features including the bridge line 23, the bead grooves 26 and the plurality of knurls 27 are formed with knurling processes as are known by one of skill in the art. With reference to FIG. 2A, a knurling apparatus 40 is shown that may form the technical features in the metal, closed-end, cylindrical workpiece or capsule. The knurling apparatus 40 includes a non-resilient sector 42 and a non-resilient spindle tip 44. The knurling apparatus 40 may include a sector port 43 or similar component that allows the non-resilient sector 42 to be attached to a rotational means, such as a lathe (not shown). The non-resilient sector 42 includes a series of indentations 45, a knife 46 and knurl indentations 47 that correspond to a series of beads 48 and knurl projections 49 in the non-resilient spindle tip 44 that forms the bead grooves 26, the bridge line 23 and the plurality of knurls 27, respectively, in a finished screw stopper capsule (not shown). In other words, the non-resilient spindle tip 44 includes the reverse of the grooves or indentations of the non-resilient sector 42 that are to be imposed on a metal, closed-end, cylindrical workpiece or capsule that is placed on the non-resilient spindle tip 44 and between the non-resilient spindle tip 44 and the non-resilient sector 42 when pressure and rotation are applied.

Figure 2B:
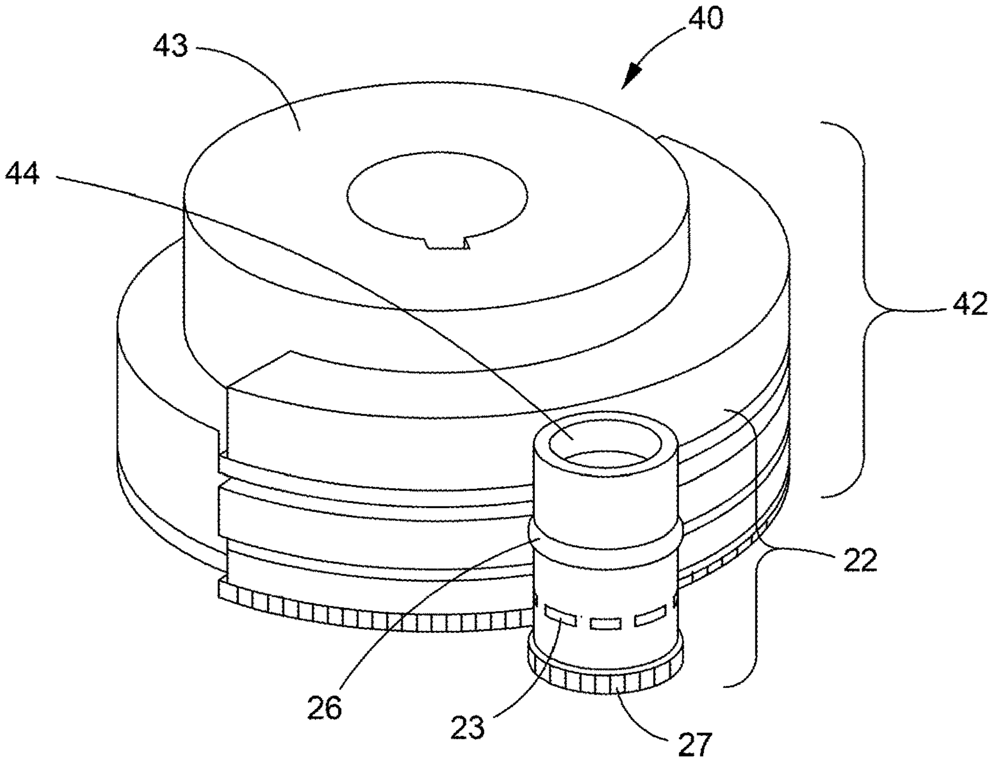
FIG. 2B illustrates a perspective view of the knurling apparatus shown in FIG. 2A that includes a capsule placed over the spindle and between the sector with technical features imparted to the capsule.

FIG. 2B shows technical features (bridge line 23, bead grooves 26 and plurality of knurls 27) that have been imparted to a screw stopper capsule 22 by the knurling apparatus 40. It should be understood that a knurling sector may or may not include all of the technical features or may include different combinations of the technical features shown in FIG. 2A. Likewise, a capsule 10, 20, 22 may include any or all of the technical features discussed herein and different combinations than what is shown in FIGS. 2A-2B. It should be further understood that the components of the knurling apparatus 40 may not correspond identically to the knurling sector 42 or the knurling spindle 44 as shown in FIGS. 2A-2B.

Non-resilient sectors 42 and non-resilient spindle tips 44 are used for preparing the capsule technical features because the non-resiliency of these materials provide adequate support for deforming the capsule to create the technical features as is known in the art. For example, the non-resilient sector 42 and the non-resilient spindle tip 44 may be made from steel or stainless steel that include a Rockwell HRC value from 55 through 66. For example, the Rockwell HRC value may be 55, 56, 57, 58, 59, 60, 61, 62, 63, 64, 65 or 66.

Figure 3:
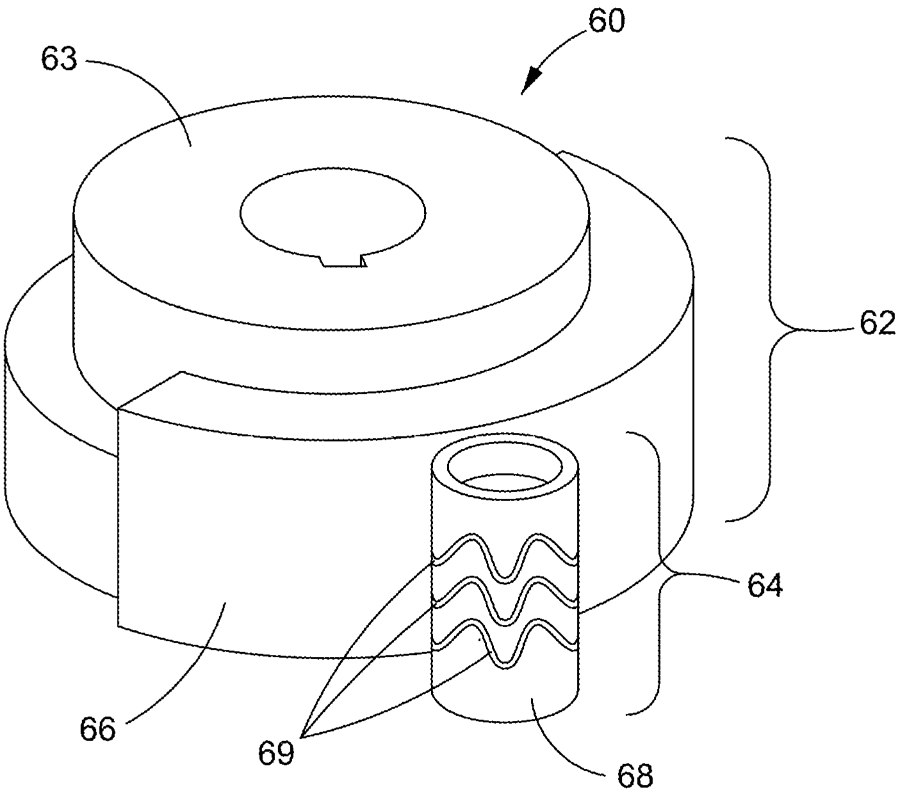
FIG. 3 illustrates a perspective view of the disclosed texturizing apparatus including a texturizing sector and a texturizing spindle tip.
Figure 4A:
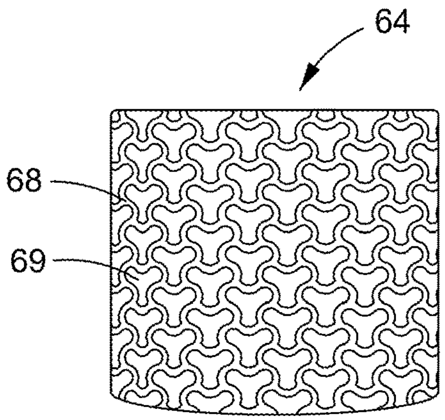
FIGS. 4A-4F illustrate front views of texturizing spindle tips.
Figure 4B:
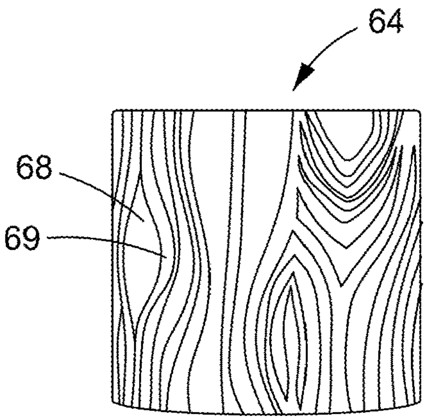
Figure 4C:
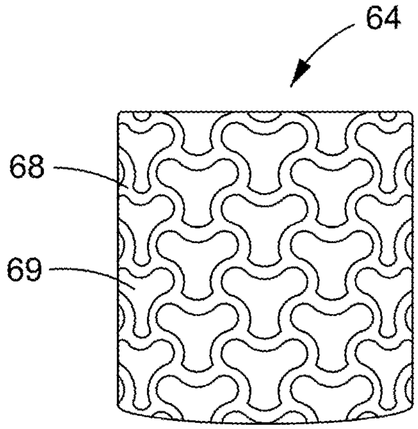
Figure 4D:
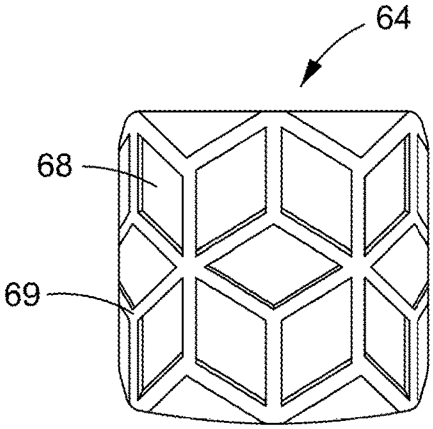
Figure 4E:
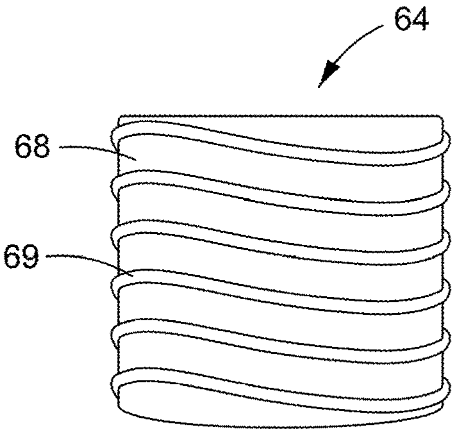
Figure 4F:
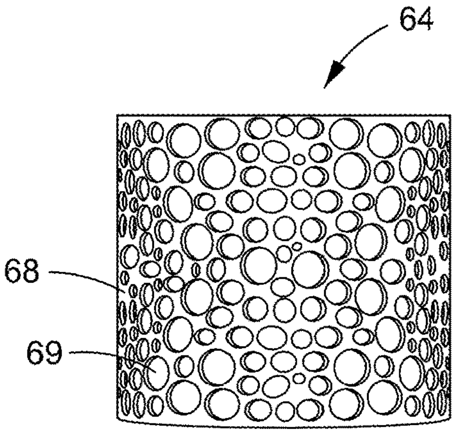

The texturizing method of this disclosure includes a texturizing apparatus 60 as shown in FIG. 3. The texturing apparatus 60 includes a texturizing sector 62 and a texturizing spindle tip 64. The texturizing sector 62 may include a texturizing sector port 63 or similar component as known in the art that allows the texturizing sector 62 to be attached to a rotational means, such as a lathe, whereas the texturizing spindle tip 64 may be attached directly to a rotational means. It should be understood that the texturizing apparatus 60 may appear other than shown in FIG. 3 as long at the texturizing apparatus includes a texturizing sector and texturizing spindle as described herein. The texturizing apparatus 60 utilizes rotation of the texturizing sector 62 and the texturizing spindle tip 64 and application of pressure between the texturizing sector 62 and the texturizing spindle tip 64 that is comparable to the rotation application of pressure that used with the knurling apparatus 40 and known by one of skill in the art. The texturizing apparatus 60 includes a texture 69 that may be included with the texturizing sector 62 or with the texturizing spindle tip 64. The texture 69 of the texturizing apparatus 60 imparts a texture to a metal, closed-end, cylindrical workpiece or capsule. The amount of applied pressure is dependent on the materials that the texturizing sector 62, the texturizing spindle tip 64 and the metal, closed-end, cylindrical workpiece or the capsule are fabricated from to produce the desired imparted texture. Exemplary values of pressure may include those from 300 Newtons to 800 Newtons. In an embodiment, the pressure may be 300 Newtons, 400 Newtons, 500 Newtons, 600 Newtons, 700 Newtons, 800 Newtons, or any value therebetween.

One of the texturizing sector 62 or the texturizing spindle tip 64 may include resilient materials in order to provide an appropriate level of deformation when texturizing a metal, closed-end, cylindrical workpiece or capsule. Materials that provide an appropriate level of deformation include those having a Shore A hardness from 85 through 98 according to ASTM D2240. In some embodiments, the Shore A hardness of the texturizing sector 62 or the texturizing spindle tip 64 material may be 85, 86, 87, 88, 89, 90, 91, 92, 93, 94, 95, 96, 97, or 98. In some embodiments, the Shore A hardness of the texturizing sector 62 or the texturizing spindle tip 64 material may be from 85 to 98, and more specifically from 90 to 95 or from 95 to 98. An exemplary material displaying Shore A hardness that includes the aforementioned values is polyurethane. Other materials that display similar resiliency may be used for the texturizing sector 62 or the texturizing spindle tip 64.

In any embodiment including a non-resilient texturizing sector 62 or the texturizing spindle tip 64, the texturizing sector 62 or the texturizing spindle tip 64 may be made from steel or stainless steel that includes a Rockwell HRC value from 55 through 66. For example, the Rockwell HRC value may be 55, 56, 57, 58, 59, 60, 61, 62, 63, 64, 65 or 66.

With reference to FIG. 3, the texturizing method further includes that one of the texturizing sector 62 or the texturizing spindle tip 64 each includes an outer surface that faces the other component. The texturizing sector 62 includes a texturizing spindle tip facing surface 66 and the texturizing spindle tip 64 includes a texturizing sector facing surface 68. The texturizing spindle tip facing surface 66 or the texturizing sector facing surface 68 includes at least a portion that is smooth or substantially smooth and the outer surface of the other component (texturizing sector 62 or the texturizing spindle tip 64) includes at least a portion that includes a texture. The texture may include a pattern. The term "smooth", as used herein, refers to surface characteristics that are of regular consistency and free from perceptible projections, indentations or unevenness. The terms "texture" or "textured", as used herein, refer to three-dimensional surface characteristics that are visually or tactilely perceptible. The terms "pattern", "patterns" or "patterned", as used herein, refer to a repeated design that may be aesthetic and/or functional (e.g., decorative appearance and/or improved grip rendered to a capsule).

In the embodiment shown in FIG. 3, the texturizing spindle tip facing surface 66 that faces the texturizing sector facing surface 68 is shown to be smooth. The texturizing sector facing surface 68 is shown to include the texture 69 in the pattern of sinusoidal projections. The texture 69 is included around the circumference of the texturizing spindle tip 64. In another embodiment, the texture 69 may be included in at least a portion of the circumference of the texturizing spindle tip 64. The texture 69 may include any shape, alphanumeric character, line(s), pattern, etc. Several examples of texturizing spindle tips 64 with each including a different texture 69 are shown in FIGS. 4A-4F.

Figure 5:
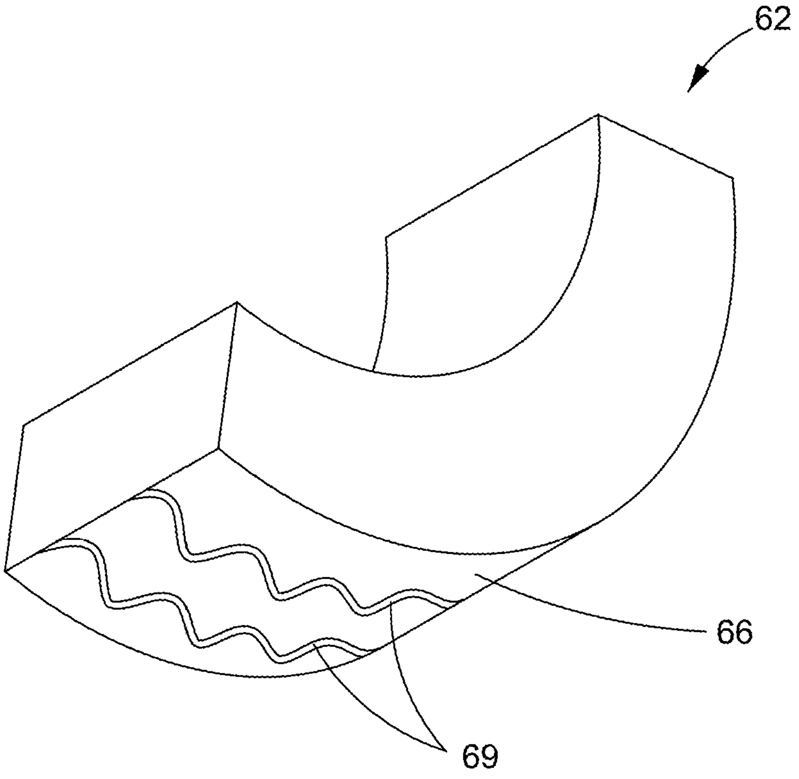
FIG. 5 illustrates a perspective view of a texturizing sector.

FIG. 5 shows a texturizing sector 62 that is isolated from the other components of the texturizing apparatus 60. In this embodiment, the texturizing spindle tip facing surface 66 includes the texture 69. The texture 69 is shown to be a pattern of sinusoidally shaped lines. In embodiments where the texture 69 is included on the texturizing sector 62, at least a portion of the texturizing spindle tip facing surface 66 includes the texture 69. In an embodiment where the texturizing spindle tip facing surface 66 includes the texture 69, a corresponding texturizing sector facing surface 68 is smooth. In another embodiment, a portion of the texturizing spindle tip facing surface 66 includes the texture 69 and the texturizing sector facing surface 68 is smooth in portions that correspond to the textured portions of the texturizing spindle tip facing surface 66 when the texturizing sector 62 and the texturizing spindle tip 64 are in rotation with each other.

In some embodiments, the texturizing sector 62 or the texturizing spindle tip 64 may be composed of resilient material. In other embodiments, at least a portion of the texturizing spindle tip facing surface 66 or at least a portion of the texturizing sector facing 68 may be composed of resilient material. In some embodiments that include a resilient portion of the texturizing spindle tip facing surface 66 or the texturizing sector facing surface 68, the resilient portion may correspond to another portion of the texturizing spindle tip 64 or the texturizing sector 62, respectively, that includes the texture 69 and that may be composed of non-resilient material.

Depending on the desired texture of the closed-end, cylindrically shaped, metal workpiece or capsule 10, 20, 30, several combinations of the texturizing sector 62 and the texturizing spindle tip 64 are within the scope of this disclosure. For example, in the embodiment that is shown in FIG. 3, the texturizing sector 62 includes resilient material and the texturizing spindle tip facing surface 66 is smooth, while the texturizing spindle tip 64 includes a non-resilient material and the texturizing sector facing surface 68 includes the texture 69. In another embodiment, the texturizing sector 62 includes non-resilient material and the texturizing spindle tip facing surface 66 is smooth, while the texturizing spindle tip 64 includes a resilient material and the texturizing sector facing surface 68 includes the texture 69. In a further embodiment, the texturizing sector 62 includes resilient material and the texturizing spindle tip facing surface 66 includes the texture 69, while the texturizing spindle tip 64 includes a non-resilient material and the texturizing sector facing surface 68 is smooth. In another embodiment, the texturizing sector 62 includes non-resilient material and the texturizing spindle tip facing surface 66 includes the texture 69, while the texturizing spindle tip 64 includes resilient material and the texturizing sector facing surface 68 is smooth.

Figure 6A:
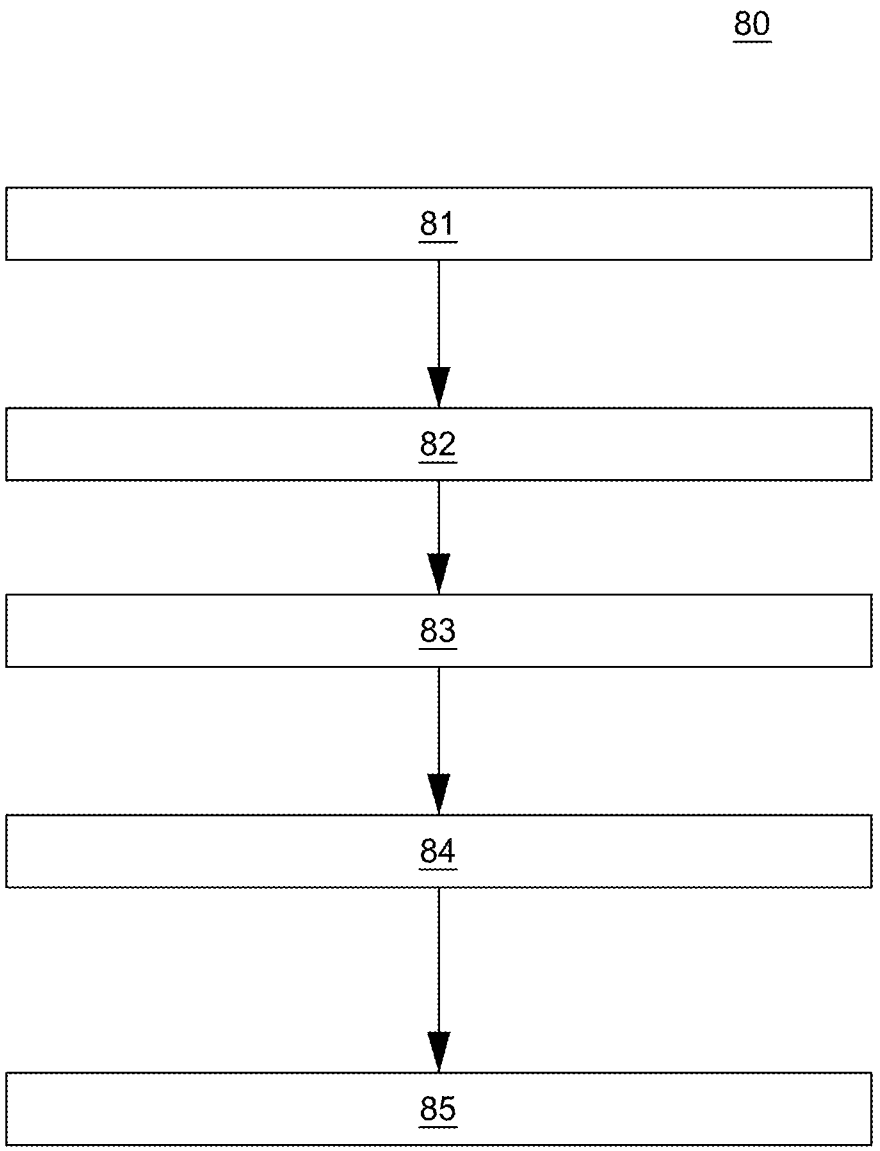
FIGS. 6A-6B illustrate steps of embodiments of the presently disclosed method.

A method for texturizing a metal, closed-end, cylindrical workpiece or capsule is further disclosed. With reference to FIG. 6A, the method 80 includes providing a texturizing apparatus that includes a texturizing sector and a texturizing spindle tip 81. A metal, closed-end, cylindrical workpiece or capsule is provided 82 and placed onto the texturizing spindle tip 83. A pressure is applied between the texturizing sector and the metal, closed-end, cylindrical workpiece or capsule 84. The texturizing spindle tip is then rotated such that a texture is imparted to the metal, closed-end, cylindrical workpiece or capsule 85.

The method further includes that at least one of the texturizing sector or the texturizing spindle tip includes resilient material. The texturizing sector includes a texturizing spindle tip facing surface that includes at least a portion that is smooth. The texturizing spindle tip includes a texturizing sector facing surface that includes a texture on at least a portion of a circumference of the texturizing spindle tip. Further, the texturizing sector is positioned external to the metal, closed-end, cylindrical workpiece or capsule. The texturizing spindle tip is positioned internal to the metal, closed-end, cylindrical workpiece or capsule. The texture of the metal, closed-end, cylindrical workpiece or capsule includes an imparted image of the texture included with the texturizing spindle tip along at least a portion of a circumference of the metal, closed-end, cylindrical workpiece or capsule.

Figure 6B:
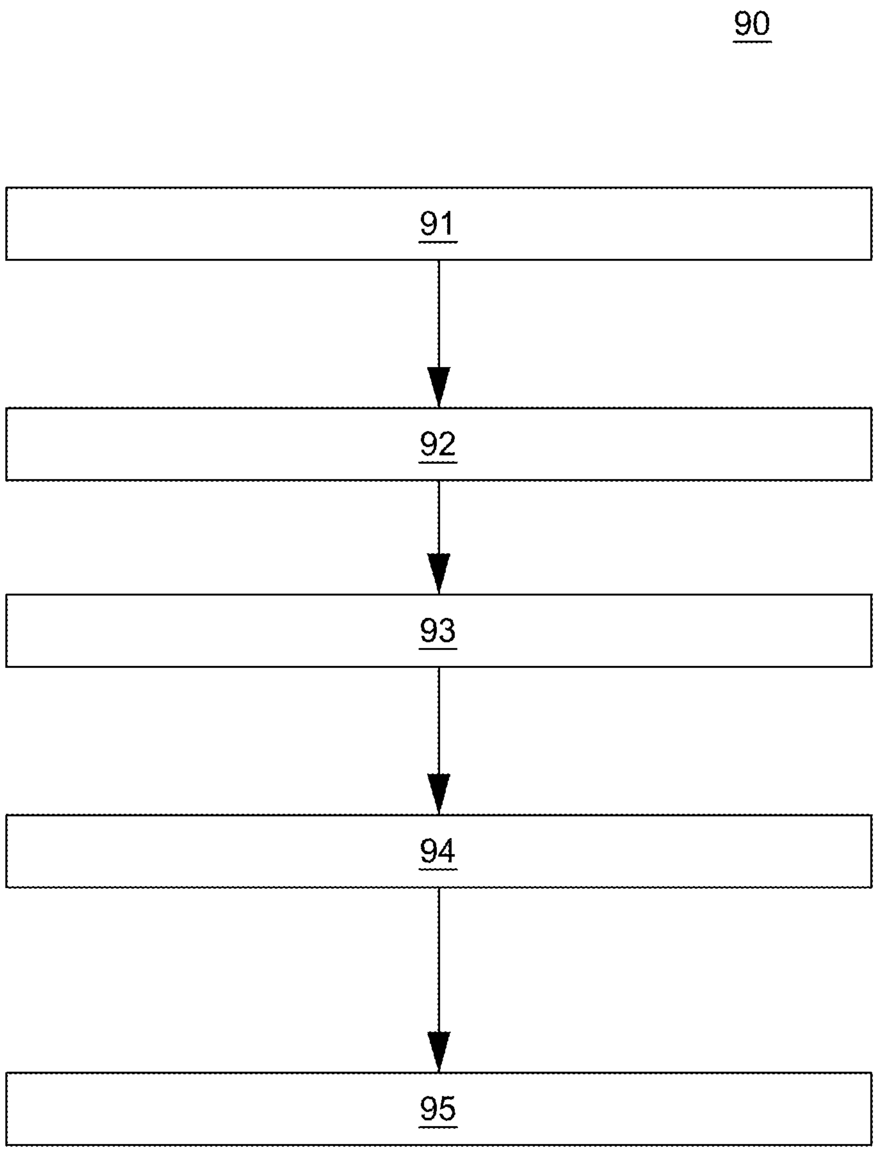

In an embodiment that is shown in FIG. 6B, the method 90 includes providing a texturizing apparatus that includes a texturizing sector and a texturizing spindle tip 91. The texturizing sector includes a resilient material and a texturizing spindle tip facing surface where at least a portion of the texturizing spindle tip facing surface is smooth. The texturizing spindle tip includes a texturizing sector facing surface that includes a spindle tip texture on at a least a portion of a circumference of the texturizing spindle tip. A metal capsule including aluminum is then provided 92. The capsule is placed onto the texturizing spindle tip 93 such that the texturizing spindle tip is positioned internal to the metal capsule and the texturizing sector is positioned external to the metal capsule. A pressure is then applied between the texturizing sector that includes resilient material and the metal capsule 94. The texturizing spindle tip is then rotated such that a texture is imparted to the metal capsule 95. The texture of the metal capsule includes an imparted image of the texturizing spindle tip texture along at least a portion of a circumference of the metal capsule.

Figure 7:
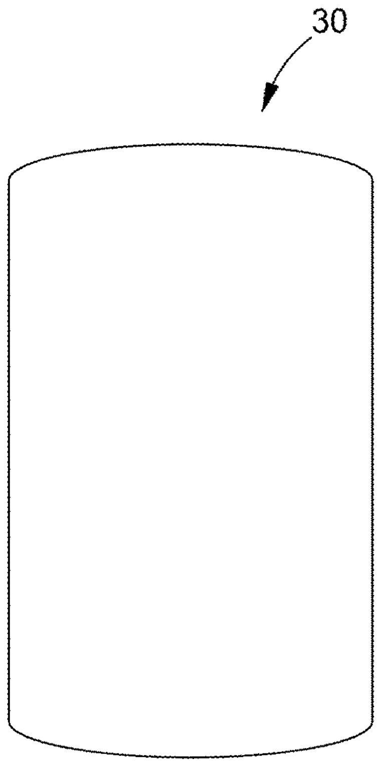
FIG. 7 illustrates a front view of a capsule such as the capsule shown in FIG. 1B.
Figure 8A:
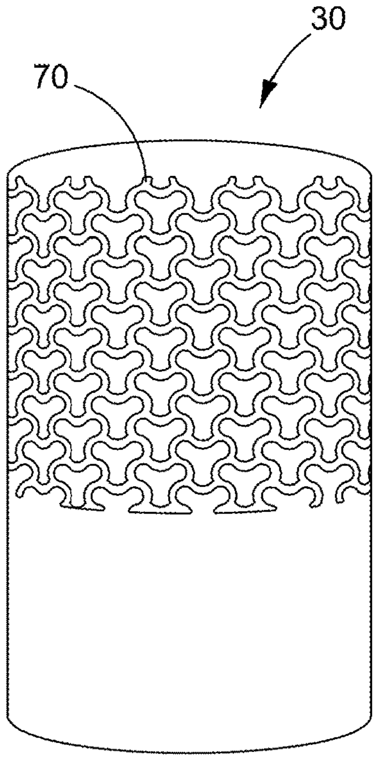
FIGS. 8A-8F illustrate front views of capsules including textures produced by the disclosed texturizing method.
Figure 8B:
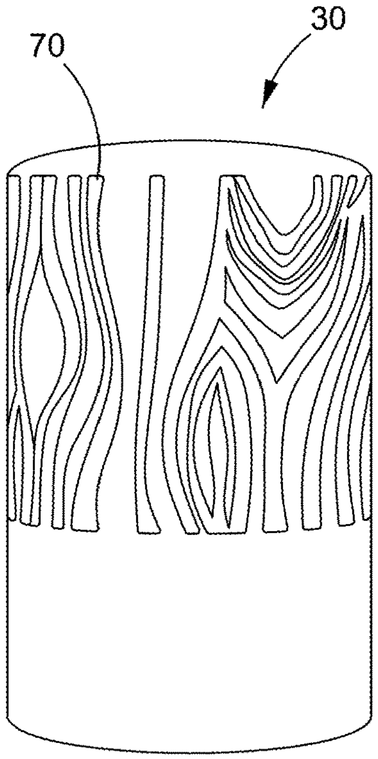
Figure 8C:
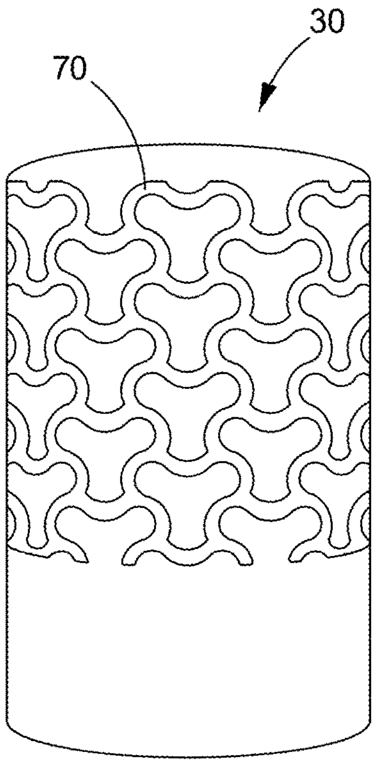
Figure 8D:
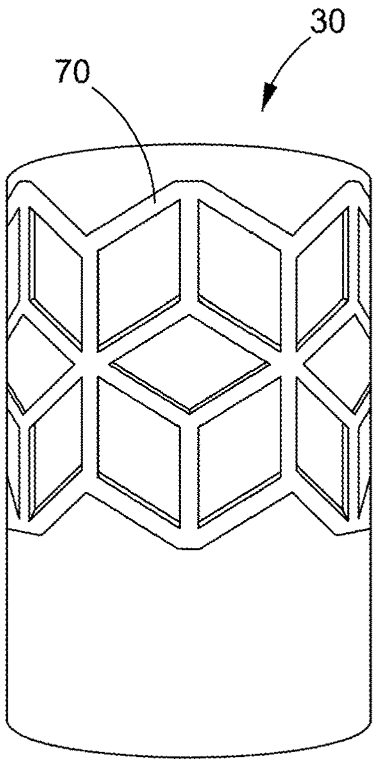
Figure 8E:
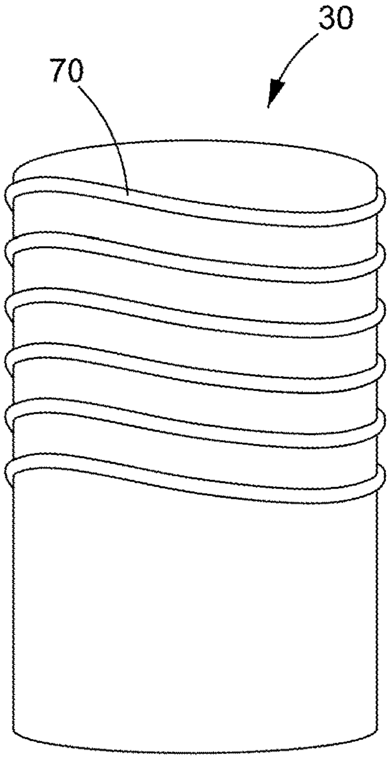
Figure 8F:
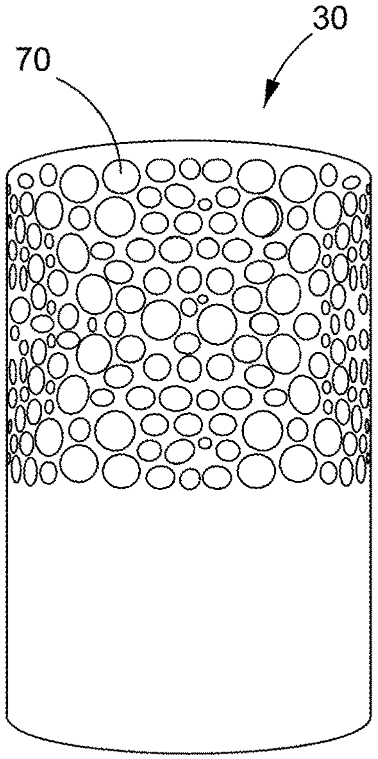

With reference to FIG. 7, a capsule 20 is shown prior to being texturized by the disclosed method. Each of FIGS. 8A-8F show a textured capsule 30 that includes the capsule 20 after it has been texturized by the disclosed method. The textured capsule 30 includes a texture 70. In the embodiments shown in FIGS. 8A-8F, the capsule texture 70 is an imparted image of the texturizing apparatus texture 69, that correspond to the texture 69 of the texturizing spindle tips 64 shown in FIGS. 4A-4F.

In an embodiment, the capsule provided by the method includes a cap and a skirt, the texturizing spindle tip texture may impart the texture to the skirt. In another embodiment, where the capsule includes a cap and a skirt, the texturizing spindle tip texture may impart the texture to the cap.

In some embodiments, the capsule provided by the disclosed method may be a screw stopper capsule. That is, the capsule may include pre-formed technical features such as a bridge line, a bead groove and/or a plurality of knurls prior to undergoing the disclosed texturizing method. In another embodiment of the disclosed method, a capsule lacking technical features may be provided even though the desired finished capsule is a textured screw stopper capsule. In this embodiment, the technical features may be formed simultaneously with the texture being imparted to the capsule; that is, the knurling method may be performed in tandem with the texturizing method.

Figure 9:
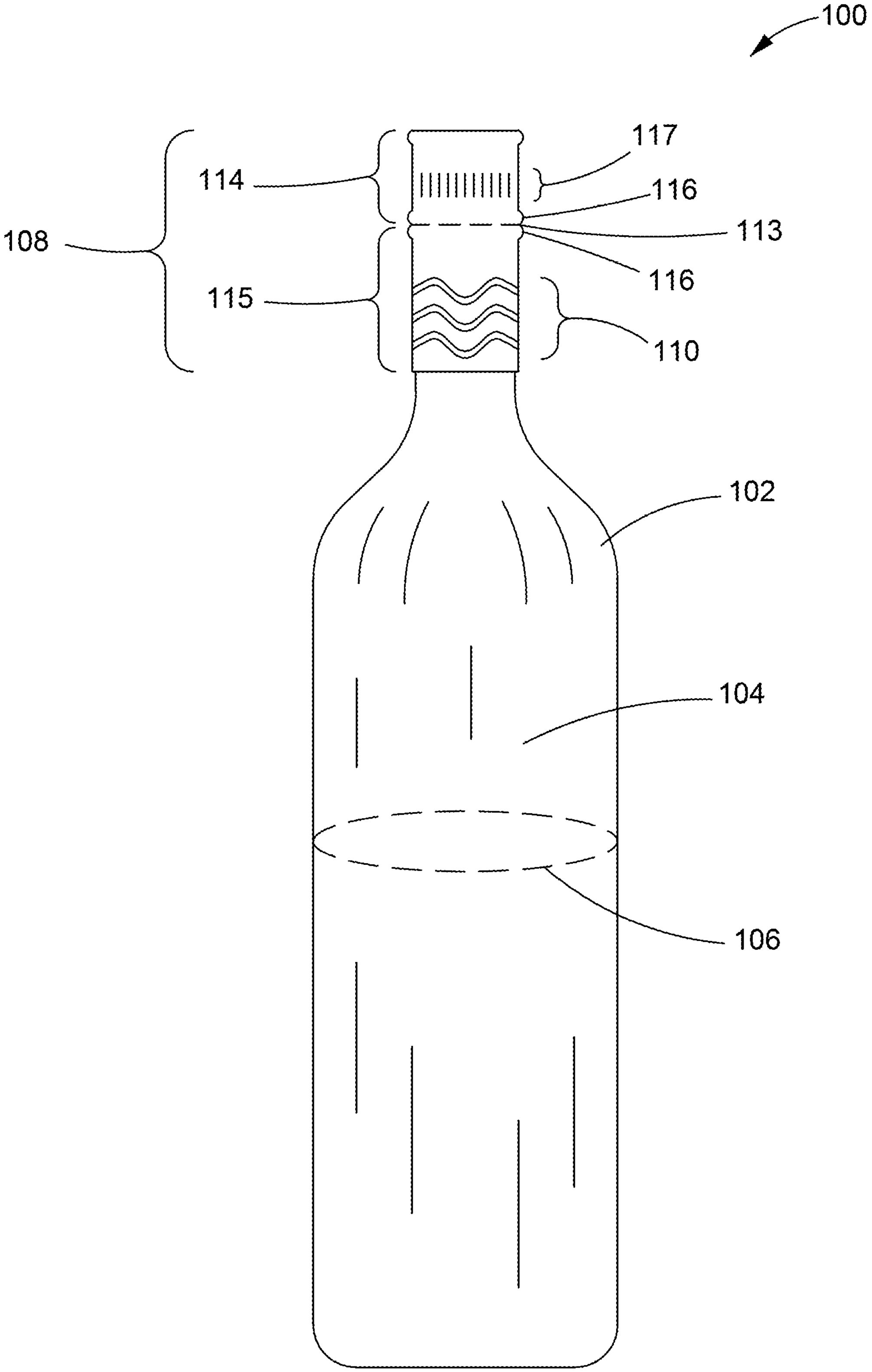
FIG. 9 illustrates a front view of a package including a capsule including a texture produced by the disclosed texturizing method.

A package may include the textured metal, closed-end, cylindrical workpiece, textured capsule or textured screw stopper capsule that is texturized by the disclosed method. The textured metal, closed-end, cylindrical workpieces or textured capsules are typically used with receptacles that customarily include a neck and an opening, such as a glass bottle that can contain wine, sparkling wine or spirits as shown in FIG. 9. An exemplary package 100 includes a bottle 102 that includes an interior cavity 104 and an opening (not shown). A product 106 (e.g., wine, sparkling wine, or spirits) can be contained in the interior cavity 104. The package 100 includes a textured capsule 108 texturized by the disclosed method and that has been capped to the bottle 102. The textured capsule 108 covers the opening of the bottle 102. In the embodiment shown in FIG. 9, the textured capsule 108 additionally includes a cap 114, a skirt 115 and further includes technical features of a bridge line 113, groove beads 116 and a plurality of knurls 117. A texture 110, imparted by the disclosed texturizing method, is included in the skirt 115 and is shown in the pattern of sinusoidal lines about the circumference of the skirt 115.

Some package embodiments may include a screw stopper capsule that includes a texture, imparted by the disclosed method, in the cap portion. In embodiments including a metal, closed-end, cylindrical workpiece or capsule, the workpiece or capsule includes a circumference and the imparted image of the texturizing apparatus may be included in any area along the circumference.

In some embodiments, the package may include a receptable other than the form of a bottle. The receptacle includes an opening that can be covered by a textured metal, closed-end, cylindrical workpiece or textured capsule. In some embodiments, the receptable may include materials other than glass, for example, metal or polymers. The package may also contain products other than liquids, for example, particulate materials.

Embodiments

A. A method for texturizing a metal, closed-end, cylindrical workpiece or a capsule that includes the steps of:
- providing a texturizing apparatus that includes a texturizing sector and a texturizing spindle tip;
- providing a metal, closed-end, cylindrical workpiece or capsule;
- placing the metal, closed-end, cylindrical workpiece or capsule onto the texturizing spindle tip;
- applying a pressure between the texturizing sector and the metal, closed-end, cylindrical workpiece or capsule; and rotating the texturizing spindle tip to impart a texture to the metal, closed-end, cylindrical workpiece or capsule;

where at least one of the texturizing sector or the texturizing spindle tip includes a resilient material, where the texturizing sector comprises a texturizing spindle tip facing surface that includes at least a portion that is smooth, where the texturizing spindle tip includes a texturizing sector facing surface including a texture on at least a portion of a circumference of the texturizing spindle tip, where the texturizing sector is positioned external to the metal, closed-end, cylindrical workpiece or capsule, where the texturizing spindle tip is positioned internal to the metal, closed-end, cylindrical workpiece or capsule, and where at least a portion of a circumference of the metal, closed-end, cylindrical workpiece or capsule includes an imparted image of the texturizing spindle tip texture or capsule.

B. A method for texturizing a metal, closed-end, cylindrical workpiece or a capsule that includes the steps of:

providing a texturizing apparatus that includes a texturizing sector that includes a resilient material and a texturizing spindle tip;

providing a metal, closed-end, cylindrical workpiece or capsule that includes aluminum;

placing the metal, closed-end, cylindrical workpiece or capsule onto the texturizing spindle tip;

applying a pressure between the texturizing sector that includes resilient material and the metal, closed-end, cylindrical workpiece or capsule; and rotating the texturizing spindle tip to impart a texture to the metal, closed-end, cylindrical workpiece or capsule;

where the texturizing sector including resilient material, includes a texturizing spindle tip facing surface that includes at least a portion that is smooth, where the texturizing spindle tip includes a texturizing sector facing surface that includes a texture on at least a portion of a circumference of the texturizing spindle tip, where the texturizing sector including resilient material is positioned external to the metal, closed-end, cylindrical workpiece or capsule, where the texturizing spindle tip is positioned internal to the metal, closed-end, cylindrical workpiece or capsule, and where at least a portion of a circumference of the metal, closed-end, cylindrical workpiece or capsule includes an imparted image of the texturizing spindle tip texture.

C. The method of Embodiment A or B, where the metal, closed-end, cylindrical workpiece or capsule further includes a bridge line, a bead groove, a plurality of knurls, or combinations thereof.

D. The method of any Embodiment A through C, where the texturizing sector includes resilient material that includes a Shore A hardness according to ASTM D224 in the range from 85 through 98.

E. The method of any Embodiment A, C or D, where the metal, closed-end, cylindrical workpiece or the capsule includes aluminum.

F. The method of any Embodiment A through E, where the texturizing spindle tip includes non-resilient material that includes a Rockwell HRC value in the range from 55 through 66.

G. The method of any Embodiment A through F, where the metal, closed-end, cylindrical workpiece or the capsule includes a cap and a skirt and where the texture of the texturizing spindle tip is imparted to the skirt.

H. The method of any Embodiment A through F, where the metal, closed-end, cylindrical workpiece or the capsule includes a cap and a skirt and where the texture of the texturizing spindle tip is imparted to the cap.

I. A metal, closed-end, cylindrical workpiece or a capsule that includes a texture produced by the method of any Embodiment A through H.

J. A package that includes a bottle, where the bottle contains a product and the package further includes the metal, closed-end, cylindrical workpiece or the capsule of Embodiment I.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The description, examples, embodiments, and drawings disclosed are illustrative only and should not be interpreted as limiting. The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention.

The invention claimed is:

1. A method for texturizing a metal capsule comprising the steps of:

providing a texturizing apparatus comprising a texturizing sector and a texturizing spindle tip;

providing a metal capsule comprising aluminum;

placing the metal capsule onto the texturizing spindle tip;

applying a pressure between the texturizing sector and the metal capsule; and rotating the texturizing spindle tip to impart a texture to the metal capsule;

wherein the capsule comprises a screw stopper capsule comprising a bridge line, a cap and a skirt; wherein the metal capsule is formed from a flat sheet of metal that is drawn, wherein at least one of the texturizing sector or the texturizing spindle tip comprises resilient material; wherein the texturizing sector comprises a texturizing spindle tip facing surface comprising at least a portion that is smooth; wherein the texturizing spindle tip comprises a texturizing sector facing surface comprising a texture on at least a portion of a circumference of the texturizing spindle tip; wherein the texturizing sector is positioned external to the metal capsule; wherein the texturizing spindle tip is positioned internal to the metal capsule; wherein at least a portion of a circumference of the metal capsule comprises an imparted image of the texturizing spindle tip texture; and wherein the texturizing spindle tip only imparts the texture to the circumference of the metal capsule.

2. The method of claim 1, wherein the screw stopper capsule further comprises a bead groove, a plurality of knurls, or combinations thereof.

3. The method of claim 1, wherein the texturizing sector comprises resilient material comprising a Shore A hardness according to ASTM D224 in the range from 85 through 98.

4. The method of claim 1, wherein the texturizing spindle tip comprises non-resilient material comprising a Rockwell HRC value in the range from 55 through 66.

5. The method of claim 1, wherein the texture of the texturizing spindle tip is imparted to the skirt.

6. The method of claim 1, wherein the texture of the texturizing spindle tip is imparted to the cap.

* * * * *